United States Patent [19]

Evangelista et al.

[11] Patent Number: 5,114,636
[45] Date of Patent: May 19, 1992

[54] PROCESS FOR REDUCING THE INTERNAL CROSS SECTION OF ELASTOMERIC TUBING

[75] Inventors: Michael L. Evangelista; Raymond A. Lia, both of Auburn, N.Y.

[73] Assignee: Welch Allyn, Inc., Skaneateles Falls, N.Y.

[21] Appl. No.: 640,493

[22] Filed: Jan. 14, 1991

Related U.S. Application Data

[62] Division of Ser. No. 563,359, Jul. 31, 1990, Pat. No. 5,018,436.

[51] Int. Cl.$^5$ .............. B29C 53/08; B29C 53/20
[52] U.S. Cl. .................. 264/40.1; 264/230; 264/235; 264/320; 264/339; 264/DIG. 41
[58] Field of Search .............. 264/281, 339, DIG. 41, 264/DIG. 40, 230, 320, 571, 40.1, 235; 156/226, 227

[56] References Cited

U.S. PATENT DOCUMENTS 4,950,258 8/1990 Kawai et al. .................. 264/230

Primary Examiner—James Lowe
Attorney, Agent, or Firm—Wall and Roehrig

[57] ABSTRACT

A hydraulic or pneumatically actuated muscle has an elongated elastomeric tubular bladder covered by a tubular braid. The bladder has a fold or invagination along its length. The process for forming this bladder can employ a fixture in the form of a threaded rod. A tubular elastomer is wrapped into the v-shaped thread on the rod. Then the wrapped rod is subjected to heat to set a fold into the tubing. The invaginate bladder can be subjected to a second, mild heat treatment to reduce curling.

6 Claims, 3 Drawing Sheets

PROCESS FOR REDUCING THE INTERNAL CROSS SECTION OF ELASTOMERIC TUBING

This is a continuation of co-pending application Ser. No. 563,359 filed on Jul. 31, 1990 and now U.S. Pat. No. 5,018,436.

BACKGROUND OF THE INVENTION

This invention relates to hydraulically or pneumatically actuated muscles, that is, devices which convert a fluid pressure into a tensive force. The invention is more specifically directed to an improved arrangement for the elongated elastomeric bladder of the muscle.

Hydraulic and pneumatic muscles can be favorably employed in an elongated flexible probe such as an borescope or endoscope for actuating its articulation or steering section. With the use of fluid muscles, the conventional long steering cables can be eliminated. This use of a fluid muscle in a borescope or endoscope is described in U.S. Pat. No. 4,962,751, filed May 30, 1989, and having a common assignee herewith. Another fluid dynamic muscle in a borescope or endoscope is described in U.S. Pat. No. 4,794,912, granted Jan. 3, 1989.

Fluid dynamic articulation and steering for a borescope or endoscope offers a distinct improvement over the conventional systems of steering cables, permitting much more accurate and precise positioning of the viewing end of the instrument within the cavity to be inspected and permitting much longer articulating borescopes or endoscopes to be built.

The hydraulic, pneumatic, or fluid dynamic muscle is made up of an elongated tubular bladder which is encased in an elongated tubular braid member disposed over it. Terminators are provided at the proximal and distal ends of the muscle to seal the ends of the bladder and to provide a place for mechanical attachment between the ends of the braid member and the mechanical members to which they are to transfer force, e.g. a cable or a muscle sheath. The braid permits the bladder within the muscle to expand laterally, i.e., radially, when fluid pressure is applied to it. As the bladder and braid expand radially, the braid contracts axially and generates an axial tensive force.

On the other hand, tension on the cable tends to stretch the muscle axially, and to squeeze the bladder radially. The amount of elongation depends upon the capacity of the bladder and its residual internal cross section when the muscle is fully elongated.

These muscles are usually employed in pairs, with one of the muscles being used to deflect the borescope steering section in one direction (i.e., to the left) and the other muscle being actuated to deflect the steering section in the other direction (i.e., to the right). To achieve optimal steering, both muscles should have identical performance characteristics. However, the present techniques for manufacturing fluid dynamic muscles have not produced highly consistent results. Moreover, it is difficult using current techniques to install the elongated bladder within the braid when the braid is in an elongated state, and so it is difficult to achieve a maximum stroke for the muscle.

OBJECTS AND SUMMARY OF THE INVENTION

It is an object of this invention to provide an improved hydraulic or pneumatic muscle of the type having an internal bladder and an external braid, and which avoids the drawbacks of the prior art.

It is an object of this invention to provide an improved hydraulic or pneumatic muscle having improved stroke characteristics.

It is a further object of this invention to provide an improved bladder for a muscle and an improved technique for producing the improved bladder, to facilitate construction and enhance operation of the muscle.

According to an aspect of the invention, the fluid dynamic muscle is provided with a bladder in the form of an elastomeric tube that has a longitudinal fold extending along it, so that the bladder has a generally U-shaped cross section before fluid pressure is applied. That is, the tube has an invaginate or concave wall that is collapsed against a diametrically opposite convex side wall. This reduces the uninflated cross sectional area of the bladder to a minimum.

The thermo plastic tubing is made into the bladder of this form by wrapping the starting tubing material onto a fixture, which is in the form of a threaded metal rod. The tubing wrapped into helical grooves of the fixture assumes a "V" shape. The fixture is placed in an oven and the fixture and tubing wrap are heated to an elevated temperature, e.g. 175° F. (80° C.), the temperature employed depending on the material and size of the tubing. This temperature should be on the order of the characteristic heat thermal deflection temperature of the elastomeric tubing being worked. After a suitable time, e.g. 75 minutes, depending on the characteristics of the tubing, the fixture is removed from the oven and the tubing wrap is removed from the fixture. At this time, the V-shaped cross section has set into the tubing, and the tubing has the desired longitudinal fold. However, it may be desirable to remove the spiral curl or length wise curvature from the tubing. For this purpose, the tubing is wrapped onto a flat form, e.g., fiber board, and is baked in another oven at an elevated temperature for predetermined length of time, e.g. 100° F. (40° C.) for one hour. Then the tubing is removed from the oven, and can be cut to length to suit as elastomeric bladders for fluid dynamic muscles.

In order to control the heating process closely, the temperature of the fixture is monitored directly, using a thermocouple or equivalent temperature sensor in intimate contact with the threaded rod.

The above and many other objects, features, and advantages of this invention will be more fully appreciated from the ensuing detailed description of a preferred embodiment, to be considered in connection with the accompanying Drawing.

DETAILED DESCRIPTION OF THE PREFERRED EMBODIMENT

Figure 1A:
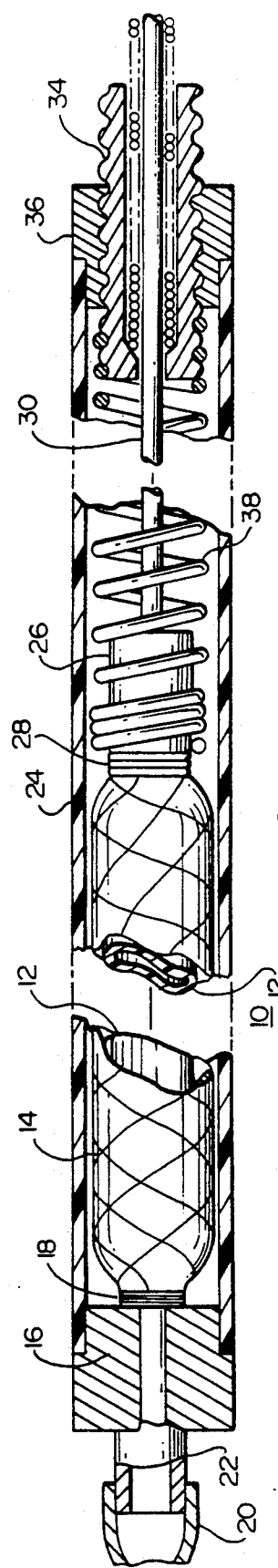
FIGS. 1A and 1B are longitudinal sectional views of a pneumatic or hydraulic muscle according to an embodiment of this invention, the muscle being shown in its inflated, contracted state and in its evacuated, elongated state, respectively.
Figure 1B:
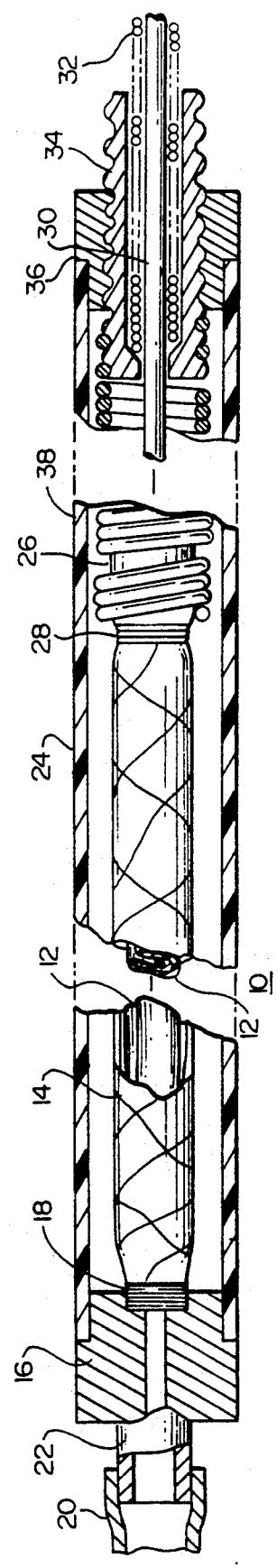

With reference to the Drawing, and initially to FIGS. 1A and 1B, a hydraulic muscle 10 has an elongated elastomeric bladder 12 and a tubular braid 14 that is disposed over the bladder 12. The braid for the hydraulic muscle is formed of interwoven, substantially inextensible filaments, such that when the bladder 12 is inflated by having hydraulic fluid applied to it under pressure, the bladder 12 and braid 14 will expand in diameter, but shorten axially, to generate a tensive force. The bladder and braid 12, 14 are secured at their proximal ends to a proximal terminator 16, which can be of the type generally described, in copending U.S. Pat. No. 4,014,600, granted May 14, 1991. The proximal ends of the braid and bladder are secured with a coil of fishline 18 or equivalent cord. The fishline provides a radially inward force to hold the bladder in sealing engagement against the terminator 16 and mechanically binds the braid 12 to the terminator 16. Standard fishline wraps and an appropriate adhesive can be employed. A hydraulic line 20 fits onto a hydraulic nipple 22 of the terminator 16, and communicates fluid pressure to the interior of the bladder 12.

A compression tube 24 is supported on a shoulder of the proximal terminator 16 and extends over the length of the bladder 12 and braid 14. Polytetrafluorethylene (PTFE) is a suitable material for the compression tube. A distal terminator 26 is attached to the distal ends of the bladder 12 and braid 14, favorably employing a wrap 28 of fishline or equivalent cord. The terminator 26 can be as described in U.S. Pat. No. 5,031,510, filed Mar. 22, 1990, having a common assignee.

A control cable 30 has its proximal end attached to the distal terminator 26, and extends out through the distal end of the muscle assembly, where it passes through a flexible tubular cable sheath 32. The cable 30 passes through an externally threaded nipple 34 that compressively supports the proximal end of the sheath 32. A distal split shoulder washer 36 has an internal thread 30 that engages the thread of the nipple 34, and also fits into the distal end of the compression tube 24. A coil evacuation spring 38 is threaded onto the proximal end of the nipple 34 and also engages a retainer pin on the distal terminator 26. This spring applies a tension onto the bladder 12 and braid 14 of the muscle. As shown in FIG. 1A, when hydraulic pressure is applied through the line 20, the bladder 12 and braid 14 shorten axially, drawing in the cable 30, and stretching the spring 38. Then, as shown in FIG. 1B, when the pressure is relieved on the line 20, the evacuation spring 38 pulls the braid 14 and bladder 12 back to an elongated state. This assists in the evacuation of fluid from within the bladder 12, and also relieves some of the force on the slackened control cable 30.

In order to maximize the stroke length of the fluid dynamic muscle 10, it is necessary to minimize the volume taken up by the tubular bladder 12 inside the braid 14.

Figure 2:
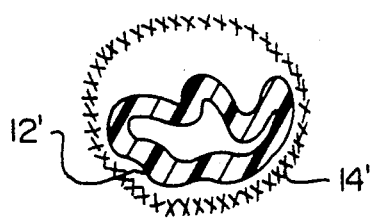
FIG. 2 is a cross-sectional view of a bladder and braid of a fluid dynamic muscle of the prior art, the bladder being in its evacuated, fully elongated state.

In a previous technique for constructing the muscles, as illustrated with FIG. 2, and in which primed reference numbers are employed, the tubular bladder 12' is collapsed by evacuating and tensioning it, and then is pulled into the interior of the braid 14'. This invariably results in the bladder 12' having an irregular cross section, and the braid 14' has to be somewhat wider than desirable to achieve maximum elongation.

Figure 3:
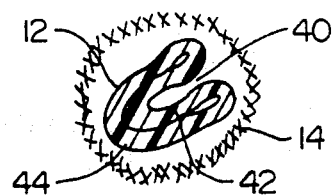
FIG. 3 is a cross sectional view of a bladder and braid of a fluid dynamic muscle of this invention, the bladder being in its evacuated, fully collapsed and elongated state.
Figure 4:
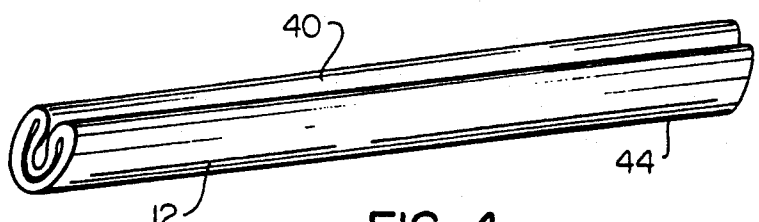
FIG. 4 shows a length of tubing which forms the bladder according to this invention.

On the other hand, in this invention the bladder 12 is given a U-shaped cross section, as shown in FIGS. 3 and 4, with an invagination 40 extending over its length. This invagination or fold causes one sidewall 42 of the tubular bladder to be concave and to position itself against a diametrically opposite convex sidewall 44. Because the cross sectional dimensions of the bladder 12 are reduced to a minimum, the braid 14 can be stretched to a longer state than was previously possible, and the braid 14 can assume a smaller diameter without interference from the bladder. Consequently, the muscle 10 employing the invaginate bladder 12 will have a longer stroke, and a more repeatable stroke characteristic from one muscle to the next, than was previously achievable.

Figure 5:
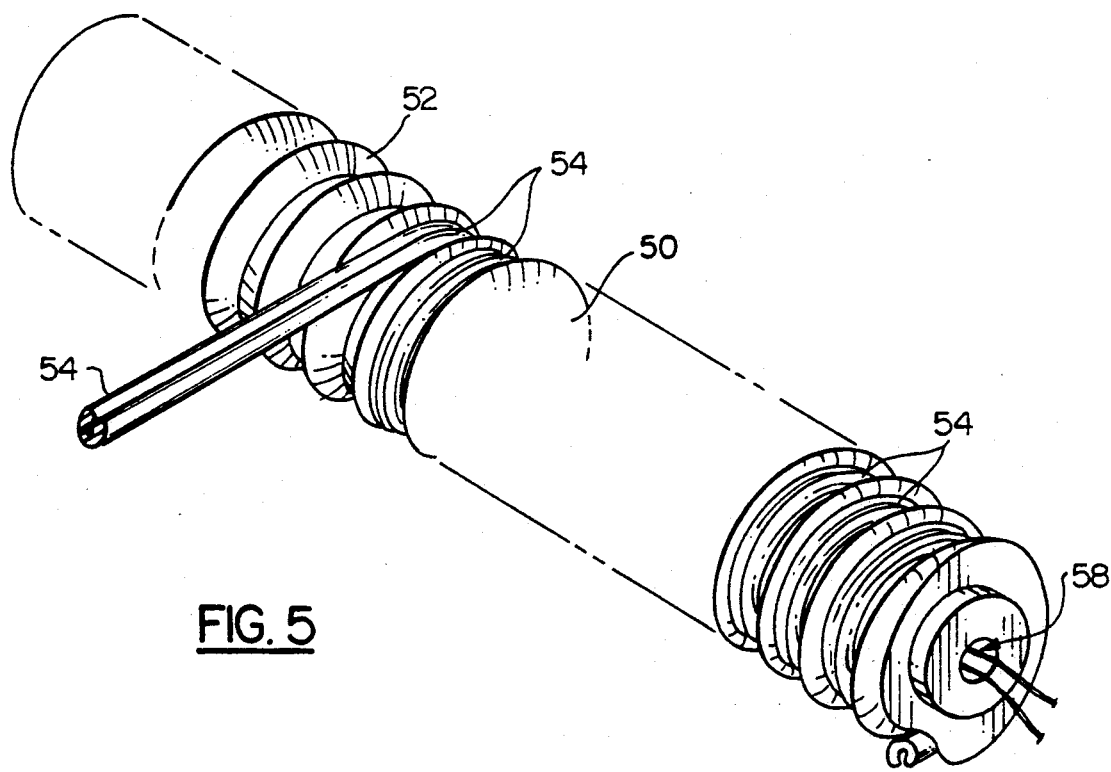
FIG. 5 shows a helical-threaded cylindrical fixture employed in the process of forming an elongated elastomeric bladder of this invention.
Figure 6:
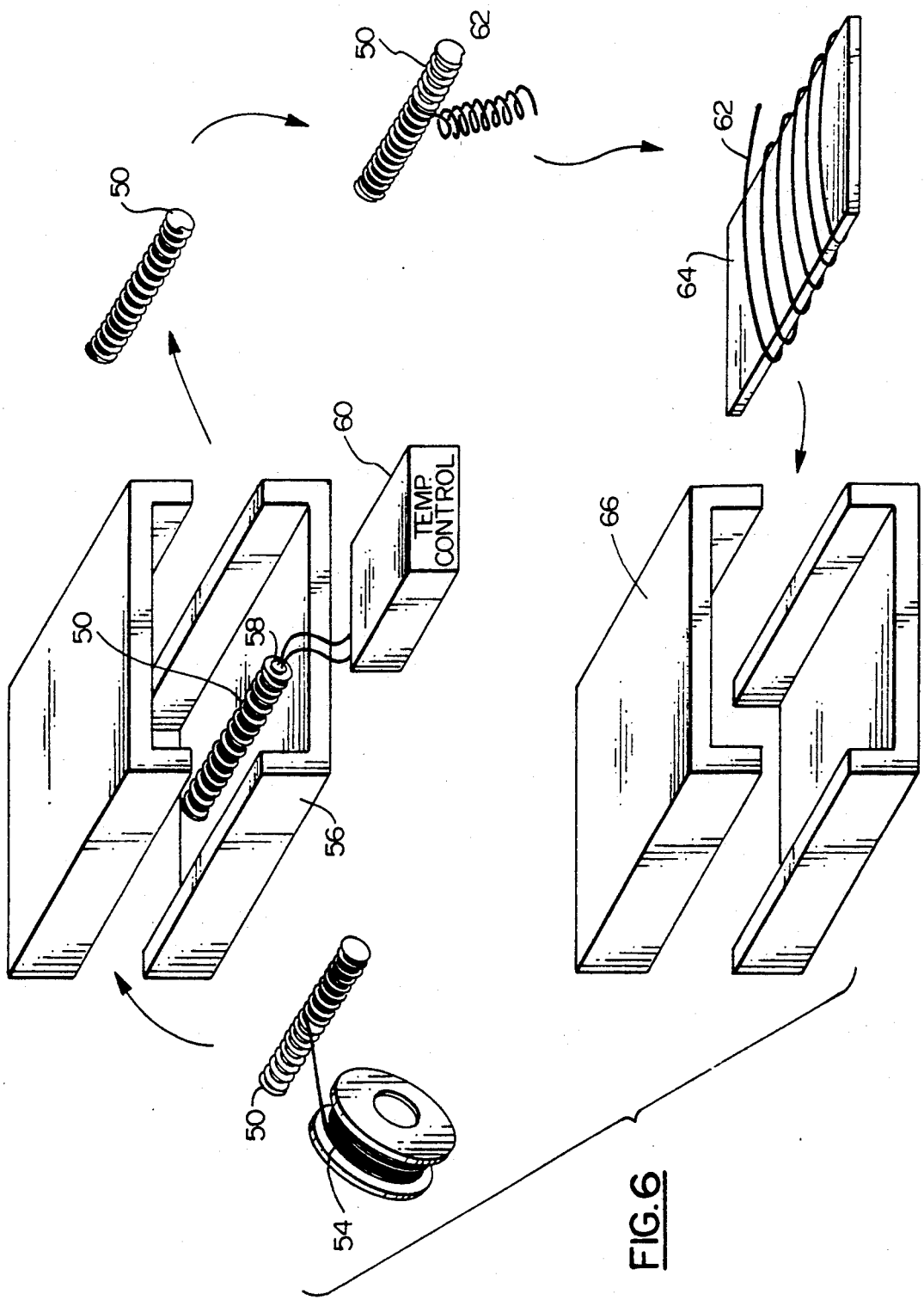
FIG. 6 illustrates the steps of forming the elongated elastomeric bladder of this invention.

The process for forming the invaginate bladder 12 of the invention involves a cylindrical fixture in the form of a threaded metal rod 50, as shown in FIG. 5. The rod 50 has a helical thread 52 of V-shaped profile. Tubular elastomeric material 54, e.g. thin-wall thermoplastic tubing such as polyurethane or polyvinyl chloride, is wrapped onto the rod in the groove of the thread 52. The tubular material assumes the desired regular invaginate form as a result of its being wrapped on the rod. This invagination is made permanent by the further processing as described in reference to FIG. 6.

After the material is wrapped onto the fixture rod 50, the latter is placed into an oven 56 for heat treatment of the elastomeric material. A thermocouple or equivalent temperature sensor 58 in direct contact with the metal rod 50 is coupled to a temperature controller 60 for the oven 56. The length of time and temperature required will vary depending on the size and material of the elastomeric tubing, but in one particular mode, the rod 50 and wrap of material 54 are held at about 175° F. (80° C.) for about one to one-and-one-half hours.

After this, the fixture is removed from the oven and the rod 50 is allowed to cool. Then the invaginate tubular material is unwrapped, here as a coil 62, from the helical threads of the rod 50.

It is often desirable to remove the curl, or longitudinally coiled shape, from the tubular material, so that it is generally straight in the lengthwise direction. To this end the coil 62 of material can be wrapped onto a flat form 64, which can be a flat board of fiber material such as paperboard. Then the form 64 and material are placed in a second oven 66. The oven 66 maintains an elevated temperature on the order of 100° F. (40° C.), i.e., less than the temperature in the first oven 56. The form 64 is removed from the oven 66 after a period of time, e.g. from 30 to 60 minutes. At that time, the tubular material is substantially straight, but has the desired U-shaped cross section. The tubing is cut into lengths suitable for use as the bladders 12 for fluid dynamic muscles.

In this embodiment, the threaded rod has a diameter of about one inch to two inches. This provides a suitable amount of curvature so that the tubular material 54, which is about 0.050 to 0.110 inches in diameter, lying in the V-shaped threads 52, will assume the desired invagination. For a somewhat larger tubing diameter, a three-inch diameter rod can be employed. For a bladder of much larger diameter material, a still larger diameter threaded fixture could be employed. The rod diameter to the tube diameter ratio is preferably about 20:1, but can be in the range 10:1 to 30:1.

While this invention has been described in detail with reference to a preferred embodiment, it should be recognized that the invention is not limited to that precise embodiment. Rather, many modifications and variations will present themselves to those skilled in the art without departure from the scope and spirit of the present invention, as defined in the appended claims.

What is claimed is:

1. Process of reducing the internal cross section of an elastomeric tubing for forming an elastomeric bladder therefrom, the process comprising the steps of
   wrapping said tubing into a helical thread on a generally cylindrical fixture which has said helical thread formed thereon;
   subjecting said tubing to heat treatment while the tubing is wrapped on said fixture, including elevating the temperature of said tubing to a suitable predetermined elevated temperature for a sufficient time for thermally setting said elastomeric tubing, thus forming a longitudinal fold therein; and
   removing said tubing from said fixture wherein the resulting tubing has said longitudinal fold therein which minimizes the internal cross-sectional area thereof.

2. Process according to claim 1 wherein said subjecting to heat treatment includes placing said fixture and tubing wrapped thereon into an oven.

3. Process according to claim 2 wherein said subjecting to said heat treatment includes directly monitoring the temperature of the fixture.

4. Process according to claim 1 wherein said predetermined elevated temperature is on the order of a characteristic heat thermal deflection temperature of the elastomeric tubing.

5. Process according to claim 1 further comprising, after said removing the tubing from the fixture,
   wrapping said resulting tubing on a flat form and subjecting the tubing on said flat form to heat treatment at an elevated temperature lower than the first-mentioned temperature for a sufficient period of time to reduce curl of said tubing in its lengthwise direction.

6. Process according to claim 1 wherein said helical thread has a generally v-shaped profile.

* * * * *